Oct. 6, 1964  R. M. MORRIS  3,152,234

SNAP ACTION THERMOSTATIC CONTROL

Filed May 15, 1961  2 Sheets-Sheet 1

INVENTOR.
REXFORD M. MORRIS

ATTORNEY

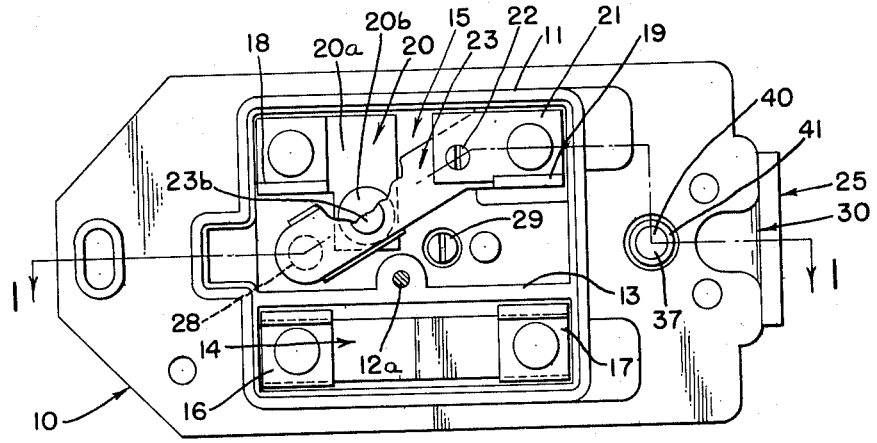
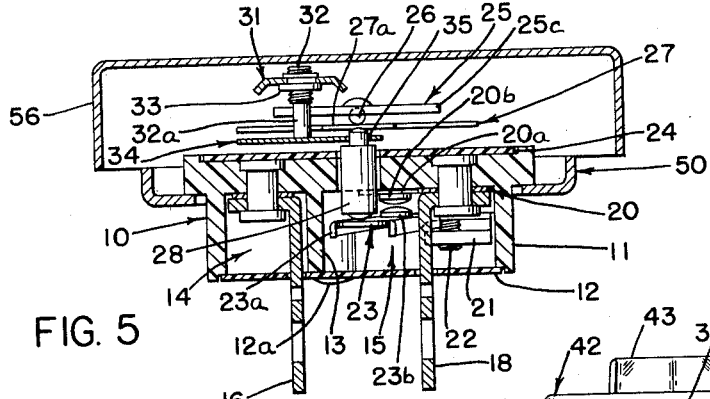
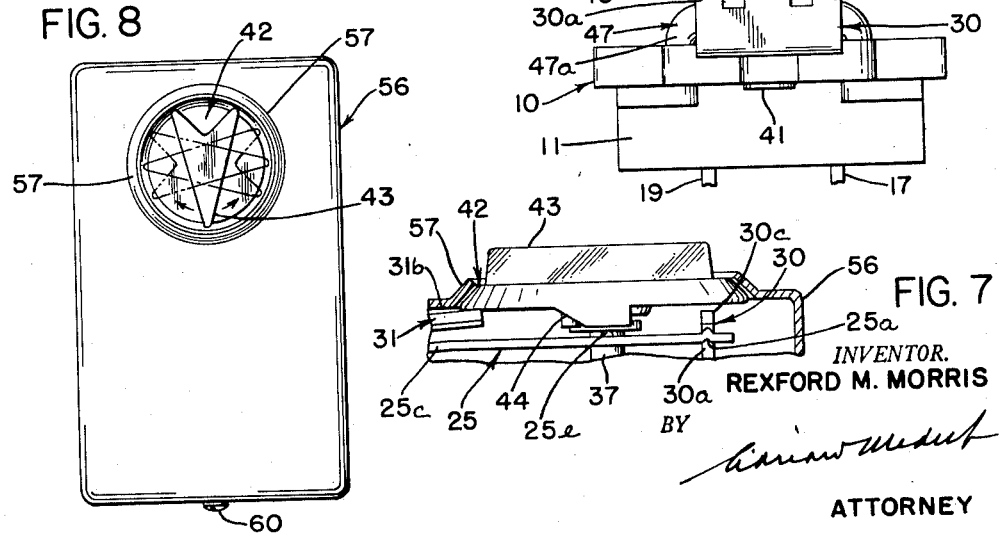

3,152,234
SNAP ACTION THERMOSTATIC CONTROL
Rexford M. Morris, Mansfield, Ohio, assignor to Therm-O-Disc, Incorporated, Mansfield, Ohio, a corporation of Ohio
Filed May 15, 1961, Ser. No. 110,262
16 Claims. (Cl. 200—122)

This invention relates to a space thermostat and more particularly to a space thermostat having a snap action mechanism for opening the load circuit of an electrical resistance heating installation wherein the snap action mechanism is highly sensitive to radiant heat.

Heretofore, space thermostats for controlling the temperature of living areas having electrical resistance type of heating units have used a bimetallic element to open the electrical contacts controlling the heating units. If the bimetallic element is connected directly to the load contacts, the contacts open slowly and arcing between the contacts occurs which causes contact erosion and substantially reduces the life of the thermostat. For this reason, it has become the accepted practice in the higher quality space thermostats to use a snap action connection between the bimetallic strip and the load contacts. Devices such as micro-switches and over-centered springs have been previously used to provide the snap action between the bimetallic strip and the load contacts. However, the use of these devices materially increases the unit cost of the space thermostat. This invention contemplates a snap action mechanism between the bimetallic element and the load contacts that is more sensitive and reliable than the prior snap action mechanisms and which may be manufactured at a substantially reduced cost.

When using a space thermostat to control an electrical type heating installation, it is necessary to provide an independent, manually operated circuit breaker within the thermostat. This circuit breaker positively disconnects the heating circuit from the bimetallic controlled mechanism to turn off the heating system. Heretofore, this circuit breaker has been incorporated in space thermostats by a separate mechanism that greatly increases the size of the thermostat and substantially increases the unit cost. This invention incorporates the manually operatable circuit breaker directly into the space thermostat so that it assumes control of the load circuit contacts when the space thermostat control knob is adjusted to a predetermined setting.

In accordance with this invention, the snap action mechanism between the load circuit contacts and the bimetallic element comprises a snap disc anchored at one end and operably connected to a load contact breaker arm at the opposite end. A central depressed portion of the snap disc abuts an adjusting post and the bimetallic element contacts the disc between this post and the point at which the disc controls the contact. This arrangement creates a force couple between the adjusting post and the point at which the bimetallic element contacts the snap disc. Thus, the force required to operate the snap disc by the bimetallic element is substantially reduced. This results in a more sensitive action of the snap element.

Further in accordance with this invention, an electrical resistance connected in parallel with the load circuit is positioned adjacent the bimetallic temperature responsive element. The heat radiating from such resistance assists in heating the bimetallic element when the load circuit is energized. Thus, the temperature-responsive element disconnects the load circuit before the space around the thermostat reaches the actual temperature of the thermostatic setting. As is known, there is a given range of temperature needed to operate a bimetallic element. This range is substantially decreased to produce a more even temperature in the heated space if an auxiliary source of radiant heat is directed onto the bimetallic element during the heating cycle. Thus the heating element is disconnected before the room reaches the desired temperature; however, the residual heat in the heating element brings the space to the proper temperature after the heating element is disconnected. In this manner, the temperature of the space is more closely controlled.

Still further in accordance with this invention, the thermostat is mounted on a metal base that provides an integral hinged structure for the thermostat cover. In this manner the cover is positioned over the thermostat by using only one mounting screw. Also the cover of the thermostat has a tapered aperture through which the indicator knob extends. By this structure, the knob is protected from damage caused during the use of the thermostat.

The primary object of this invention is to provide a snap action thermostat, for electrical resistance heating installation, which thermostat has a simplified snap action mechanism, is dependable and can be manufactured at a substantially reduced cost.

A still further object of this invention is to provide a snap action thermostat having a positive disconnect operably connected with the snap action mechanism so that the load circuit is manually disconnected by adjusting the thermostat control knob.

Still a further object of this invention is a snap action thermostat having means for disconnecting the heating circuit before the heated space reaches a predetermined temperature to thereby provide a more constant temperature control of the heated space.

Another object of this invention is the provision of a space thermostat that is easily mounted onto the wall of a given installation.

Still a further object of this invention is to provide such a thermostat having substantially fewer component parts.

A further object is the provision of a snap actuator in a space thermostat wherein a concaved disc snap element is used and a force couple in the disc causes it to snap in either direction of concavity.

These and other objects and advantageous features of the invention, not at this time more particularly pointed out, will become apparent as the nature of the invention is better understood from the following detailed description, taken in conjunction with the accompanying drawings, wherein like reference characters denote corresponding parts, and wherein:

FIGURE 4 is a bottom elevational view of the invention with the closure removed taken along line 4—4 of FIGURE 1;

FIGURE 5 is a cross-sectional view taken along lines 5—5 of FIGURE 1;

FIGURE 6 is a partial side elevational view taken along lines 6—6 of FIGURE 1;

FIGURE 7 is a fragmentary detail view of the positive off cam mechanism; and

FIGURE 8 is a plan view of the thermostat as mounted on a wall.

Figure 1:
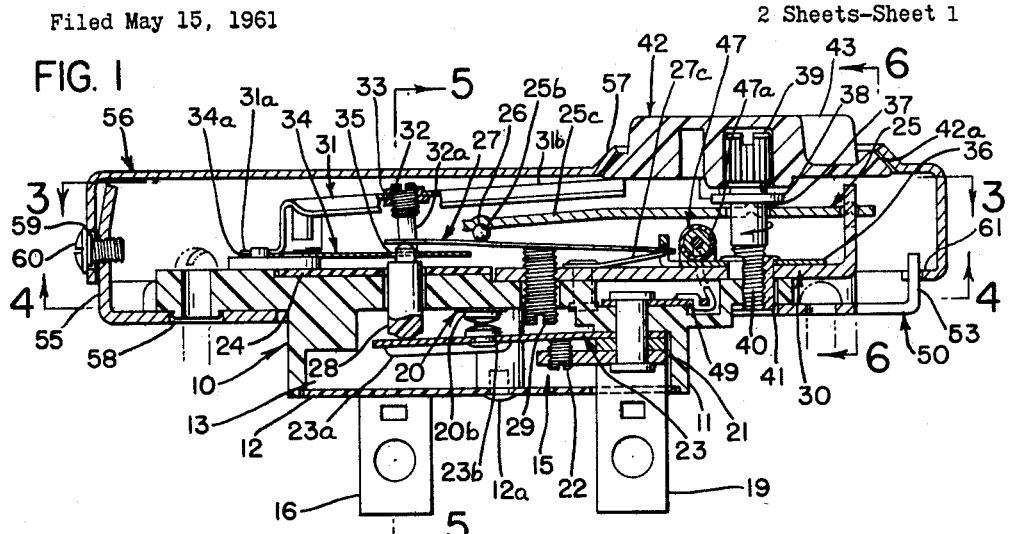
FIGURE 1 is a medial cross-sectional view of the preferred embodiment of this invention taken along the line 1—1 of FIGURES 3 and 4.

Now referring to the drawings, in FIGURE 1 the thermostatic components are mounted on a base 10 composed of plastic or other electrical insulating material. A depending box-like housing 11 defines a pair of switch chambers 14 and 15 divided by an integral wall 13 (see FIGURE 4). Chamber 14 houses load terminals 16 and 17 whereas chamber 15 houses the circuit breaking switch to be hereinafter described in detail. A closure 12 is positioned over the terminals to close the housing 11 and it is held in position by a rivet 12a.

Within the switch chamber 15 there is a depending line terminal 18 connected to an electrical power supply and a depending load terminal 19 connected to the heating load circuit. Mounted under the line terminal 18 is a contact arm 20 provided with an off-set leg 20a which carries stationary contact 20b. A movable arm 23 having reinforcing ribs 23a is mounted under the load terminal 19 and carries movable contact 23b. The gap screw bracket 21 is affixed to the plastic base by the same rivet that secures the load terminal and the movable arm. Through this bracket passes a center adjusting screw 22 that contacts the lower surface of the movable arm 23 to set the gap between stationary contact 20b and movable contact 23b. Rivets or similar attaching devices are used to secure the various terminals onto the plastic base 10. Since the rivets should not be exposed, there is provided a shield 24 that covers the upper rivet heads of the rivets used to secure terminals 16 and 18 onto the base. The terminals 17 and 19 are covered by an epoxy resin as will be discussed in more detail below.

Figure 2:
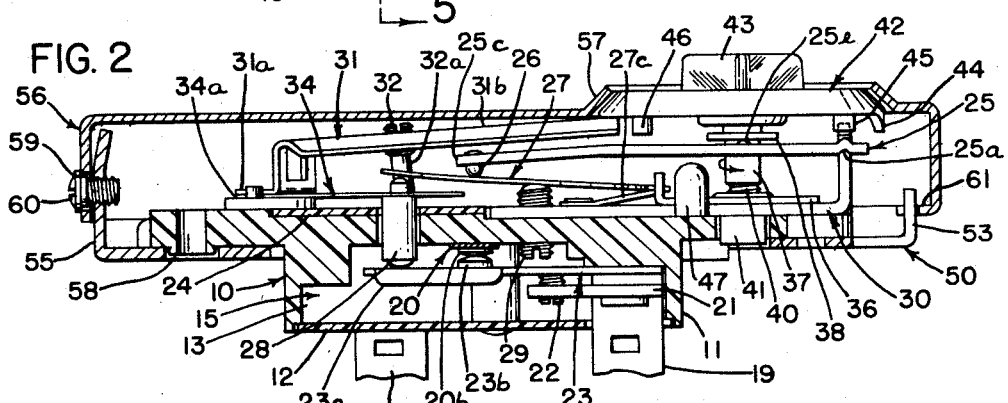
FIGURE 2 is a fragmentary sectional view of the structure found in FIGURE 1 shown in an alternate position.
Figure 3:
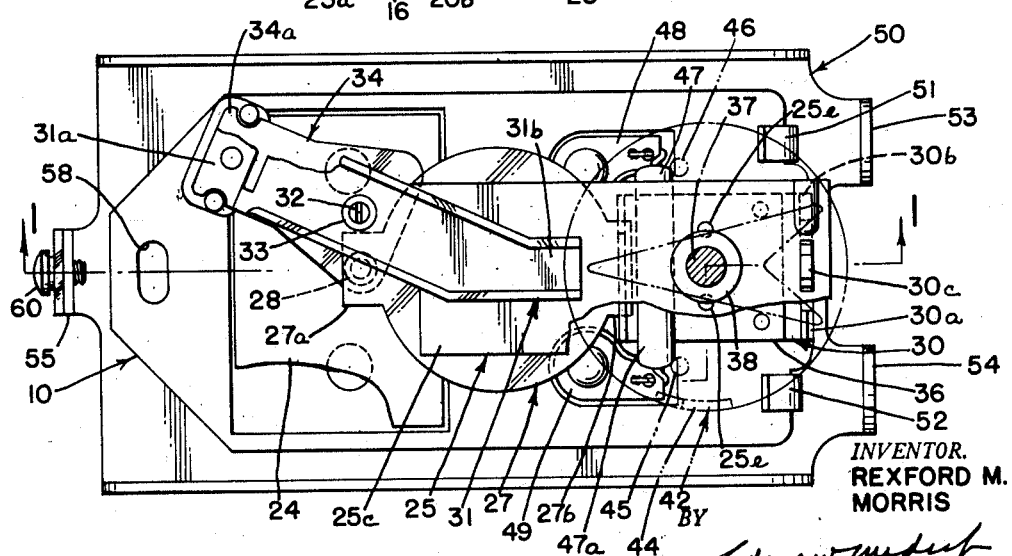
FIGURE 3 is a top elevational view of the preferred embodiment of this invention with the cover removed taken along the line 3—3 of FIGURE 1.

The thermostat is controlled by a bimetallic element 25 with a knife support groove 25a at the far end thereof as is disclosed in FIGURE 2. The forward portion 25c of the bimetallic element is formed to provide the necessary temperature-responsive characteristic of the element. A ball bearing 26 is received within a spherical recess 25b on the bimetallic element so that the element may coact with the surface of the concaved snap disc 27 in a hinged like manner to thereby reduce the friction between the two elements. The snap disc 27 as shown in FIGURE 3 has oppositely extending tabs 27a and 27b. To anchor the rear portion of the snap disc the tab 27b extends through an aperture in bracket 36 and is held in this position by spring 27c. As the disc 27 is snapped from the upward to the lower position of concavity by action of the bimetallic element 25, the extending tab 27a forces a snap element bumper 28 downwardly through an aperture in plastic base 10. The bumper 28 is slidably restrained within this aperture so that upon downward movement of the bumper, movable arm 23 is forced downwardly to disengage contact 23b from stationary contact 20b to open the load circuit of the heating element (not shown). Thus it is seen that as the bimetallic element is heated, the ball bearing 26 snaps the disc 27 downwardly so that bumper 28 actuates arm 23 to open the load circuit. The snap disc has a preformed depression at its centers so that the desired snap characteristic of the disc is obtained. The force couple necessary to actuate the disc may be varied by adjusting screw 29 located in the switch chamber 15. In this manner, the snapping point of the disc 27 is restrained or adjusted with relation to bumper 28 to prevent a premature opening or closing of the contacts. The bracket 36 is mounted directly on the upper surface of the base plate 30 and this base plate has an upwardly extending rear portion terminating in knife blades 30a and 30b. These blades support the rear portion of the bimetallic element and provide a relatively friction-free support. A tab 30c extends through the bimetallic element and has a function that will be described in detail later.

In space thermostats used to control electrical resistance heating installations, it is necessary that there be provided disconnecting mechanism so that at a certain thermostat setting, the load circuit is disconnected irrespective of the temperature existing in the heated area. To accomplish this, an off arm 31 is mounted by portion 31a onto the plastic base 10 and it extends transversely across the snap element bumper 28. A threaded bushing 33 mounted through an aperture in the off arm receives an adjusting screw 32. The adjusting screw has a downwardly depending shank 32a which contacts the outer end of the cantilever actuator 34 having a portion 34a mounted under the portion 31a of the off arm. Thus, downward movement of the off arm forces the cantilever actuator 34 downwardly so that an aperture 35 of said actuator passes over the extended shank of bumper 28 to contact a circular shoulder on this bumper. Thus, the bumper is moved downwardly to open the load contacts 20b and 23b. The adjusting screw 32 allows proper movement of the actuator 34 on corresponding downward movement of the off arm 31. The manual temperature setting knob 42 has a setting indicator 43 provided integrally thereon. This indicator 43 is adjusted to apply force on the bimetallic element 25 to obtain the desired temperature setting. Depending from the manual setting knob is an off cam 44 that contacts the cam portion 31b of the off arm to move the arm downwardly thus opening the load circuit.

To adjust the temperature setting of the thermostat, an adjusting screw 37 having a knurled shank portion 39 affixed to the knob 42 is rotated by the knob. This causes an integral shoulder 38 to move upwardly or downwardly according to the direction of rotation of the knob. The upward and downward movement of the shoulder is caused by the interaction of threaded shank 40 of the adjusting screw and threaded adjusting screw bushing 41 that is mounted onto the plastic base 10. By allowing the shoulder 38 to contact the bimetallic element 25 through integral dimples 25e, the displacement of the shoulder 38 determines the amount of force being exerted on the snap element 27 by the ball bearing 26. Thus, rotation of the knob adjusts the temperature setting of the mechanism. To control the amount of adjustment provided on the bimetallic element, a pair of depending stops 45 and 46 is integrally molded on the under surface of the knob 42. As is seen in FIGURE 6, these knobs coact with tab 30c of the base plate 30 to restrict rotation of the knob.

Referring to FIGURE 3, a resistance 47 having an outer plastic insulating cover 47a is connected to terminals 17 and 19 by lugs 48 and 49 which are soldered onto the wires extending from either end of the resistance 47. It is noted that the lugs 48 and 49 are mounted within recessed portions on base 10. If desired, these recessed portions may be filled with a suitable insulating material such as an epoxy resin to further insulate this connection and also provide insulation at the upper portion of the rivets holding terminals 17 and 19 onto the base.

The plastic base 10 is held on a base mounting bracket 50 by sliding the end of the base into lugs 51 and 52 lanced from the surface of the bracket. The central portion of the bracket is removed so that the housing 11 may extend therethrough to accommodate electrical connection with the terminals. The bracket and base as shown in FIGURE 3 are assembled onto a wall box by passing a screw through the bracket at one end and through elongated openings 58 in the base and brackets at the other end. This mounting is disclosed in the phantom line of FIGURE 1. After the plastic base and mounting brackets are positioned on the wall box, lugs 61 on the cover are passed through apertures in arms 53 and 54 and the cover is secured to the base by a screw 60 passing through aperture 59 of the cover 56. Tapered protective flange 57 as shown in FIGURE 7 extends upwardly and around tapered portion 42a of the knob 42. This is to protect the knob from damage caused by bumping or other impact while the thermostat is in use.

In operation, the temperature-responsive bimetallic element 25 moves downwardly as viewed in FIGURE 1 when there is a rise in the temperature in the space surrounding the thermostat. The downward movement of the bimetallic element results in a force couple in disc 27 determined by the force exerted by ball bearing 26 and the adjusting screw 29 and the distance between these members. As this couple increases, it reaches a value whereby the snap element 27 shifts to its downward position of concavity causing tab 27a to force bumper 28 downwardly. Through this downward movement, movable arm 23 shifts to thereby open the load contacts 20b and 23b. The adjusting screw 29 controls the force couple that operates the snap element 27 so that movement of this screw changes the snapping point of the disc 27 and prevents premature operation of the contacts. The upward force exerted on the bumper 28 by the movable arm 23 is controlled by adjusting screw 22 which is preferably sealed in its adjusted position after the proper contact force has been exerted on the movable arm. By rotating knob 42 clockwise as viewed from the front of the thermostat, the shoulder 38 is moved downwardly to exert increased force on the bimetallic element 25 through dimples 25e. In this manner, the force on the bimetallic element 25 is accordingly increased so that an initial force couple in the snap element 27 between the ball bearing 26 and adjusted screw 29 is increased to provide a lower temperature at which the snap element will open the contacts. Since there is leverage between the ball bearing 26 and the adjusting screw 29, it requires a lesser force to operate the snap element than would be needed if this leverage were not provided in the snap mechanism.

To manually disconnect the load contacts irrespective of the temperature in the heated space, the arm 31 is cammed downwardly by cam 44 that rides over the arm when the knob 42 is rotated as far as possible in a clockwise direction as viewed from the top of the thermostat. As the arm moves downwardly, it contacts the cantilever actuator 34 by shank 32a of adjusting screw 32. Thus, the actuator abuts the upper portion of bumper 28 and causes this bumper to separate contacts 20b and 23b. This gives a positive manual mechanism for disconnecting the load terminals thus de-energizing the heating circuit without requiring a completely separate circuit breaker for this purpose. In accordance with this feature, it is noted that both the temperature-responsive mechanism and the positive circuit breaker control the load contact through the same bumper 28.

After the space has reached a given temperature, the contacts open to de-energize the heating elements. Of course, the heating elements retain a certain amount of heat so that the temperature of the controlled space will continue to increase until the heating elements have lost this residual heat. This feature prevents adequate temperature control of the heating space. To alleviate the over run of heat, the resistance 47 is connected across terminals 17 and 19 and thus in parallel relationship with the heating elements. As the heating elements are energized, the resistance 47 radiates heat. By placing the resistance close to the temperature-responsive element 25, the element is heated to a temperature higher than that in the heated space. In this manner, the heating circuit is disconnected slightly before the heated space reaches the preset temperature. The heating elements are de-energized and the residual heat in the heating elements causes the heated space to come up to the preset temperature. In this manner, the thermostat has a heat anticipatory aspect that allows accurate control of the tempertaure around the thermostat. In essence, this resistance 47 gives an auxiliary heat source while the temperature around the bimetallic element is increasing. This decreases the temperature of the control space at which the bimetallic element opens the contacts. Since the auxiliary heat source is not used when the temperature around the bimetallic element is decreasing, the temperature of the space at which the contacts are closed is not changed. Thus, by decreasing the space temperature at which the contacts open while the space temperature at which the contacts close is not changed, the temperature range in the control space is held more uniform.

The terminals 16 through 19 are used to connect the thermostat in the electrical heating circuit by appropriate clips that encompass any frayed ends of the electrical cable and hold it onto the terminals.

Although this invention has been described in its preferred form with a certain degree of particularity, it is understood that the present disclosure of the preferred form has been made only by way of example and that numerous changes in the details of construction and combination and arrangement of parts may be resorted to without departing from the spirit and the scope of the invention as hereinafter claimed.

Having thus described my invention, I claim:

1. A thermostat for controlling the heating element of an electric heating installation comprising: a base having an upper surface and a lower surface, switch means including separable contacts mounted on said lower surface of the base for controlling the heating element, temperature-responsive means mounted on said upper surface of the base, said temperature-responsive means having a bimetallic element and a snap member, said bimetallic element actuating said snap member into a first or a second snap position in accordance with ambient temperature changes about the element, manually operated means effective to vary the conditions under which the said bimetallic element and snap member are operable, said manually operated means supported on the upper surface of the base and engagable with said bi-metallic member, means extending through the base operatively connecting said snap member to one of said contacts to open the contacts as the temperature about the bimetallic element increases to move said snap member into its first position and to close the contacts when the temperature about the bimetallic element decreases to move said member into its second position.

2. A thermostat as defined in claim 1 wherein said snap member comprises a disc having a central depression whereby shifting of said depression causes the member to assume the first or the second position of concavity.

3. A thermostat as defined in claim 2 wherein said disc snap element has a first and a second integral tab extending oppositely from said central depression, said first tab mounted on said base and said second tab abutting the means extending through said base.

4. A thermostat as defined in claim 3 wherein said means extending through said base comprises a bumper slidably received in said base.

5. A thermostat as defined in claim 3 wherein said base threadably receives an adjusting post, said post contacting said snap disc adjacent the center of said central depression and on the side opposite the bimetallic element, whereby rotation of said post changes the point at which said snap member moves from one of its positions to the other of its positions.

6. A thermostat for controlling the heating element of an electric heating installation comprising a base having an upper surface and a lower surface, switch means including separable contacts mounted on said lower surface of the base for controlling the heating element, a temperature-responsive means mounted on the said upper surface of the base, said temperature-responsive means having a bimetallic element and a snap member, said bimetallic element actuating said snap member into a first or a second snapped position in accordance with temperature changes about the bimetallic element, means extending through the base connecting said snap member to one of said contracts to open the contacts as the temperature about the bimetallic element increases to move said snap member into its first position and to close the contacts when the temperature about the bimetallic element decreases to move said member into its second position, manually operable means supported on the upper surface of the base engagable with said bi-metallic member and effective to vary the operation condition of said bi-metallic element and snap member, said manually operable means including a cam element arranged to operate positive disconnect means for said contacts, said disconnect means comprising a pivoting arm mounted on said base and adapted to be manually cammed downwardly, said disconnect means also contacting said means extending through said base when said arm is cammed downwardly to thereby open said contacts.

7. A thermostat as defined in claim 6 whereby said pivoting arm has a downwardly depending adjustable screw that contacts a cantilever actuator mounted on said base and said cantilever actuator engaging said means extending through base.

8. A thermostat for controlling the heating element of an electric heating installation comprising a base having an upper and a lower surface, switch means including separable contacts mounted on said lower surface of the base for controlling the heating element, temperature-responsive means mounted on said upper surface of the base, a snap disc disposed between the temperature-responsive means and the said upper surface engaging said temperature-responsive means, a manually operable positive disconnect means mounted on said upper surface of the base, means extending through said base connecting said snap disc and said positive disconnect to said separable contacts at a point on said disc, means for adjusting the pressure on the temperature-responsive means and means to adjust the pressure on the central portion of said snap disc, said temperature-responsive means engaging said disc at a point between the central portion of said disc and the point at which said snap disc is connected to said separable contact to thereby cause a variable force couple in said disc to control the actuation of said disc.

9. A thermostat as defined in claim 8 wherein said temperature-responsive means comprises a bimetallic element having a first end connected to said base and a second end abutting said snap disc.

10. A thermostat as defined in claim 9 wherein a ball bearing is located between said bimetallic element and said snap disc.

11. A thermostat as defined in claim 8 wherein said means for adjusting the pressure on the central portion of said snap disc comprises a post threadably received on said base below said disc.

12. A thermostat as defined in claim 8 wherein said temperature-responsive adjusting means comprises a manually rotatable control knob having a post passing through said bimetallic element and threadably received in said base, said post having a shoulder which contacts the bimetallic element to vary the pressure on this element as the knob is rotated.

13. A thermostat as defined in claim 12 wherein said control knob has a cam portion that contacts said positive disconnect means to cam said means downwardly thereby positively separating said contacts.

14. A thermostat for controlling the heating element of an electric heat installation comprising: a base having an upper surface and a lower surface, separable contacts located adjacent said lower surface for controlling the heating element, a temperature-responsive means located adjacent said upper surface, said temperature-responsive means comprising a bimetallic element, a snap disc having a central depression, a bumper slidably received in said base, said bimetallic element contacting said snap disc to actuate the disc in accordance with the temperature changes of the bimetallic element, said disc actuating said slidable bumper to open and close said contacts, a manually operable control knob having a depending post extending through said bimetallic element and threadably received in said base whereby rotation of said knob varies the pressure on said bimetallic element, a positive disconnect means abutting said slidable bumper and cammable downwardly, said knob having a cam in contact with said positive disconnect means whereby said cam moves said positive disconnect means downwardly to open said contacts, and a cover having an outside surface and being placed over said base, said cover having an opening through which said knob extends, whereby said knob may be rotated at the outside surface of said cover to vary the pressure on said bimetallic element and to positively open said contacts.

15. A thermostat as defined in claim 14 wherein said knob has an outer tapered surface and said cover has an outwardly tapered surface about said opening, said tapered surface of said knob complementary to said tapered surface of said cover.

16. A device for controlling the heating element of a space heating installation comprising a mounting base having top and bottom mounting surfaces; an electrical switch assembly mounted on one of said mounting surfaces and including a stationary contact and a movable contact, said movable contact being biased in switch closed position; thermo-responsive switch actuating means supported on the other of said mounting surfaces and having a longitudinal extending bi-metallic element and snap acting means responsive to movement of said bi-metallic element for moving said movable contact to its switch open position; manually actuated means supported on the said one of said mounting surfaces operable on said bi-metallic element and snap acting means for varying the temperature condition under which switch actuating means will open said switch; heating means disposed adjacent said bi-metallic member connected in series with said contacts and effective on said bi-metallic element when said switch is closed to cause said contacts to open before the ambient temperature surrounding said switch reaches a predetermined temperature value and cam means operable upon a member extending through said mounting base and engagable with the movable contact for opening said switch assembly independent of said thermo-responsive actuating means, said cams means being operable by said manually operated means.

References Cited in the file of this patent

UNITED STATES PATENTS

| | | |
|---|---|---|
| 1,985,100 | Kuln et al. | Dec. 18, 1934 |
| 2,011,610 | Bletz | Aug. 20, 1935 |
| 2,317,831 | Vaughan et al. | Apr. 27, 1943 |
| 2,394,121 | Ulanet | Feb. 5, 1946 |
| 2,456,153 | Schell | Dec. 14, 1948 |
| 2,681,395 | Malone | June 15, 1954 |
| 3,005,076 | Mertler | Oct. 17, 1961 |

FOREIGN PATENTS

| | | |
|---|---|---|
| 708,438 | Great Britain | May 5, 1954 |